April 14, 1936.　　　　M. T. VOIGT　　　　2,037,644

INDIVIDUAL DRIVE TRANSMISSION UNIT

Filed July 19, 1934

INVENTOR

Max T. Voigt

BY Augustus B. Stoughton.

ATTORNEY.

WITNESS:

Patented Apr. 14, 1936

2,037,644

UNITED STATES PATENT OFFICE 2,037,644

INDIVIDUAL DRIVE TRANSMISSION UNIT

Max T. Voigt, Reading, Pa., assignor to American Safety Table Company, Reading, Pa., a corporation of Pennsylvania Application July 19, 1934, Serial No. 735,976

2 Claims. (Cl. 192—18)

The object of my invention is to provide an improved and simplified transmission unit. My device is particularly useful for transmitting power from individual electric motors to sewing machines, but may, of course, be used for many other purposes.

More specifically, my invention consists in a housing, a web extending across said housing, a motor shaft mounted in said web, an electric motor mounted in one end of said housing and connected to said motor shaft, an end plate mounted in the other end of said housing, a stub shaft slidably mounted in said end plate, a pulley mounted on said stub shaft, a driven member mounted on said stub shaft, a fly-wheel mounted on said motor shaft, a brake on said end plate co-operating with said driven member in one position thereof, means for shifting said stub shaft and the elements carried thereby so that said driven member engages said fly-wheel or said brake, and means stressing said last-mentioned means to normally hold said driven member against said brake.

It will be obvious to those skilled in the art that my invention consists of a combination of elements each of which is capable of numerous modifications within the scope of my invention.

For a further exposition of my invention, reference is made to the annexed drawing and specification at the end whereof the novel features of my invention will be pointed out and claimed.

Figure 1:
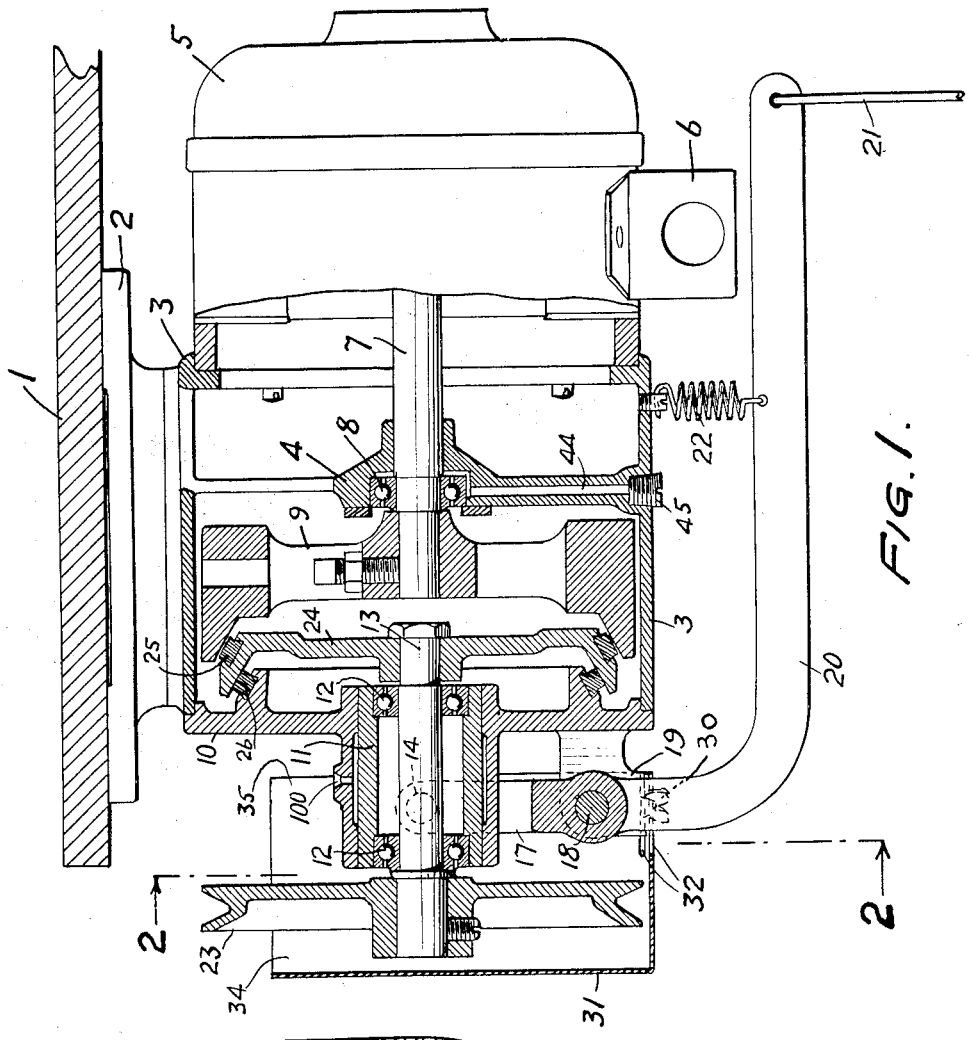
Fig. 1 is a side elevation of my device, with parts broken away in vertical cross-section.
Figure 2:
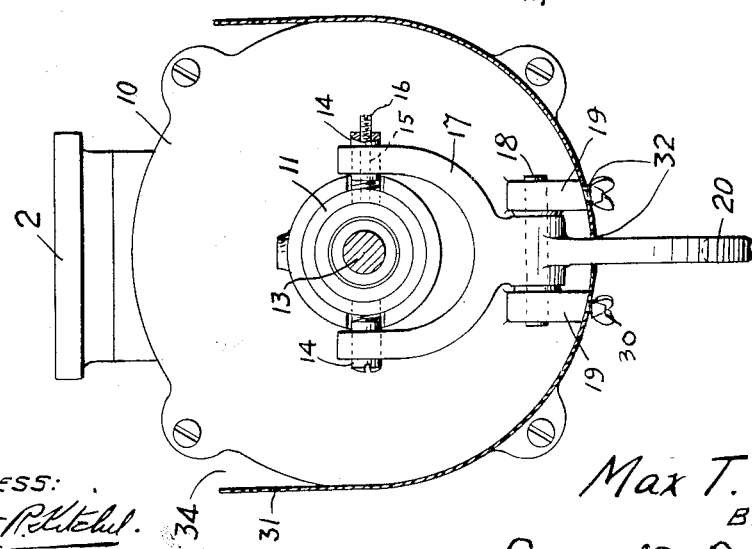
Fig. 2 is a cross-section, on line 2—2 of Fig. 1, viewed in the direction of the arrows.

In that embodiment of my invention chosen for illustration in the drawing, my device is shown as consisting of a support 1, such as a sewing machine table. On this support is mounted, by means of base 2, a cylindrical casing or housing 3, which has a web 4 extending across it in the interior thereof. Part of web 4 is perforated, to provide an oil groove 44 which is closed at its end by a screw 45. At one end of housing 3 is mounted an electric motor 5, to which current is supplied by means of a junction box 6. A motor shaft 7 is mounted in web 4 by means of bearings 8 and is connected to the electric motor 5. At the opposite end of shaft 7 from motor 5, there is connected a fly-wheel 9.

At the opposite end of housing 3 from motor 5, there is located an end plate 10, in which is slidably mounted a sleeve 11, of bronze or suitable similar material, which carries bearings 12 in it. End plate 10 has an oil hole 100 therein adjacent sleeve 11. A stub shaft 13 is slidably mounted in end plate 10 by means of sleeve 11. Cooperating with sleeve 11 are pins 14, one of which is hollowed to provide an oil passage 15 closed by a screw 16. Pins 14 co-operate with a yoke 17, pivotally mounted by means of stud 18, in lugs 19 on end plate 10. At the opposite side of pivot stud 18, yoke 17 is connected to a lever 20, to which is attached a link 21 from a foot-treadle or other operating device. Spring 22, interposed between housing 3 and lever 20, stresses stub shaft 13 in one direction.

At one end of stub shaft 13 is mounted a pulley 23, from which a sewing machine or other device may be driven by means of a belt. At the inner end of stub shaft 13, there is mounted a driven member 24, and which has, on its outer face, a clutch facing 25 of leather or similar material. End plate 10 also carries on its inner surface, adjacent the outer rim of driven member 24, a brake 26 consisting of a ring of leather or similar substance.

At their lower ends, lugs 19 carry wing-nuts 30, which serve to attach a guard 31 of sheet metal or similar material by means of slots 32 in the guard. Guard 31 has an open top 34 and an open rear face 35, so that it surrounds pulley 23, but is spaced therefrom, thereby protecting the rotating parts of the machine.

The operation of my device is quite simple. Electric motor 5 is normally continuously rotating. In order to connect to the motor 5, the sewing machine or other device which is to be driven, the treadle or other operating means connected to link 21 is depressed, thereby operating lever 20, yoke 17, pins 14, sleeve 11, stub shaft 13, and driven member 24. This results in the engagement of leather 25 with fly-wheel 9, thus causing the rotation of stub shaft 13 and pulley 23 mounted thereon. To stop the machine, the treadle or other device connected to link 21 is released, and spring 22 operates lever 20 and the parts operated thereby in a reverse direction, so that driven member 24 engages brake 26, whereby the rotating parts are brought to a quick and smooth stop.

I do not intend to be limited save as the scope of the prior art and of the attached claims may require.

I claim:

1. An individual drive transmission unit, comprising in combination, a casing, a web extending across the interior of said casing, an electric motor detachably mounted on and closing one end of said casing, a motor shaft connected to said motor and mounted in said web, an end plate closing the opposite end of said casing, a stub shaft slidably mounted in said end plate, a pulley on said stub shaft, a fly-wheel on said motor shaft, a driven member on said stub shaft co-operating with said fly-wheel, a brake on said end plate co-operating with said driven member, and means for reciprocating said stub shaft and said elements mounted thereon so that said driven member engages said fly-wheel or said brake.

2. In an individual drive transmission unit, the combination of, a cylindrical housing, an end plate mounted on and closing one end of said housing, a shaft mounted for rotation in said end plate, a pulley mounted on said shaft for rotation adjacent said end plate, lugs on said end plate, a lever pivotally mounted in said lugs for moving said shaft perpendicularly to said end plate, a guard surrounding said pulley and having slots in one edge thereof through one of which slots said lever passes, and attaching means fastened through others of said slots and connecting said guard to said lugs.

MAX T. VOIGT.